US011565344B2

United States Patent
Watanabe

(10) Patent No.: US 11,565,344 B2
(45) Date of Patent: Jan. 31, 2023

(54) DEVICE AND METHOD FOR LEARNING FOCAL POSITION OFFSET OF LASER PROCESSING APPARATUS, AND LASER PROCESSING SYSTEM CORRECTING FOCAL POSITION OFFSET

(71) Applicant: Fanuc Corporation, Yamanashi (JP)

(72) Inventor: Kazuki Watanabe, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 251 days.

(21) Appl. No.: 16/837,236

(22) Filed: Apr. 1, 2020

(65) Prior Publication Data

US 2020/0331096 A1  Oct. 22, 2020

(30) Foreign Application Priority Data

Apr. 19, 2019  (JP) .............................. JP2019-080447

(51) Int. Cl.
| | |
|---|---|
| B23K 26/03 | (2006.01) |
| B23K 26/04 | (2014.01) |
| B23K 26/046 | (2014.01) |
| B23K 26/042 | (2014.01) |
| B23K 26/06 | (2014.01) |

(52) U.S. Cl.
CPC .......... *B23K 26/046* (2013.01); *B23K 26/042* (2015.10); *B23K 26/0643* (2013.01); *B23K 26/0648* (2013.01)

(58) Field of Classification Search
CPC ............................ B23K 26/046; B23K 26/042
See application file for complete search history.

(56) References Cited

U.S. PATENT DOCUMENTS

| | | | |
|---|---|---|---|
| 9,233,434 B2* | 1/2016 | Keen ....................... | B23K 26/21 |
| 10,643,127 B2 | 5/2020 | Takigawa et al. | |
| 10,664,767 B2* | 5/2020 | Takigawa ............. | B23K 26/083 |
| 10,792,758 B2* | 10/2020 | Izumi ................... | B23K 26/707 |

(Continued)

FOREIGN PATENT DOCUMENTS

| | | | |
|---|---|---|---|
| JP | 06148026 A | 5/1994 | |
| JP | 2002239768 A | 8/2002 | |

(Continued)

*Primary Examiner* — Helena Kosanovic
*Assistant Examiner* — Lawrence H Samuels
(74) *Attorney, Agent, or Firm* — RatnerPrestia

(57) ABSTRACT

A machine learning device for learning a focal position offset of a laser processing apparatus. A data acquisition section acquires a learning dataset which includes data of a focal position command for a light-focusing optical system given to the laser processing apparatus and detection data of a physical quantity of light detected when a laser beam is emitted from a laser oscillator in accordance with a processing command including the focal position command. A learning section generates a learning model by using the learning dataset, which represents correlativity between the physical quantity of the detected light and the positional relationship of an effective light-focusing position of the light-focusing optical system relative to a workpiece. When performing processing, the physical quantity of light is detected so that a positional relationship between the workpiece and the effective light-focusing position during processing can be estimated from the detected quantity and the learning model.

15 Claims, 13 Drawing Sheets

(56) References Cited

U.S. PATENT DOCUMENTS

| | | | | |
|---|---|---|---|---|
| 2006/0228095 | A1* | 10/2006 | Eda | B23K 26/064 |
| | | | | 385/147 |
| 2012/0188365 | A1* | 7/2012 | Stork | B23K 26/046 |
| | | | | 348/90 |
| 2013/0188178 | A1* | 7/2013 | Keen | B23K 26/03 |
| | | | | 356/122 |
| 2017/0270434 | A1* | 9/2017 | Takigawa | G06N 3/006 |
| 2019/0076958 | A1* | 3/2019 | Izumi | B23K 26/0643 |

FOREIGN PATENT DOCUMENTS

| | | | |
|---|---|---|---|
| JP | 2002346783 | A | 12/2002 |
| JP | 2005334928 | A | 12/2005 |
| JP | 2013535340 | A | 9/2013 |
| JP | 2016002580 | A | 1/2016 |
| JP | 2017131937 | A | 8/2017 |
| JP | 2017164801 | A | 9/2017 |
| JP | 2019051541 | A | 4/2019 |

* cited by examiner though deviates from the designed position of the focal
DEVICE AND METHOD FOR LEARNING FOCAL POSITION OFFSET OF LASER PROCESSING APPARATUS, AND LASER PROCESSING SYSTEM CORRECTING FOCAL POSITION OFFSET

CROSS-REFERENCE TO RELATED APPLICATIONS

This application is a new U.S. Patent Application that claims benefit of Japanese Patent Application No. 2019-080447, dated Apr. 19, 2019, the disclosure of this application is being incorporated herein by reference in its entirety for all purposes.

BACKGROUND OF THE INVENTION

1. Field of the Invention

The present invention relates to a machine learning device and machine learning method, configured to learn a focal position offset of a laser processing apparatus. The present invention also relates to a laser processing system capable of correcting a focal position offset.

2. Description of the Related Art

In a laser processing or machining apparatus having a light-focusing optical system including a lens, a mirror, a protective window, etc., sometimes a focal distance of the light-focusing optical system changes due to disturbances such as heat associated with laser beam irradiation and the position of a focal point of the actually focused laser beam (in the present application, referred to as an "effective light-focusing position" of the light-focusing optical system) thereby deviates from the designed position of the focal point determined through calculations (in the present application, referred to as a "focal position" of the light-focusing optical system). If the effective light-focusing position of the light-focusing optical system deviates from the focal position of the latter at the time of performing processing steps, a positional relationship between a workpiece and the effective light-focusing position is liable to become different from a target positional relationship determined by a processing program and to affect the quality of the laser processing.

Correcting the deviation or displacement of the effective light-focusing position from the focal position (in the present application, referred to as a "focal position offset") in a laser processing apparatus has been conventionally known.

For example, Japanese Unexamined Patent Publication No. 2002-239768 (JP 2002-239768 A) describes "a focused size or area of a laser beam (3) on a worked surface (4a) is determined, and if the focused size or area deviates from a predetermined reference value, it is assumed that the focal position of the laser beam (3) deviates from a predetermined reference position, and a laser head (2) and a workpiece (4) is relatively moved in accordance with the amount of deviation" and "an image of the laser beam 13, with which the worked surface 14a is irradiated, is captured by a camera 16, the deviation of the operation distance from the focal distance, i.e. the deviation of the laser irradiation position from the focal position, is detected based on the position of the captured laser beam 13 on the camera screen, and the operation distance is controlled based on the detected deviation" (claim 1, paragraph 0003).

Japanese Unexamined Patent Publication No. 2005-334928 (JP 2005-334928 A) describes "a laser beam emitted from a laser oscillator 550 of a laser processing apparatus and passing through an output mirror 560 is reflected by a mirror 570 and introduced into a laser machining tool 60. The laser beam collected by a machining lens 62 is reflected by a reflector plate M1 and detected by a reflected light detector 580. Automatic adjustment of the focal point is achieved by detecting the power of the reflected light and changes in the focal position due to fouling of the machining lens 62" (Abstract).

Japanese Unexamined Patent Publication No. 2016-002580 (JP 2016-002580 A) describes "a processing head is positioned relative to a reference measurement surface having a small opening so as to make a laser beam axis pass through the small opening, laser irradiation is performed while focusing the laser on the reference measurement surface or the near or far side of the same, the level of radiant light radiated from at least part of the surroundings of the small opening of the reference measurement surface is measured, the shift amount of the focal point is determined based on the measured value, and the focal position of the laser is corrected" (claim 1).

SUMMARY OF INVENTION

In order to improve a precision of correction of a focal position offset of a laser processing or machining apparatus provided with a light-focusing optical system, it is ensured that, when the laser processing apparatus performs processing of a workpiece, a positional relationship between the workpiece and an effective light-focusing position of the light-focusing optical system can be estimated while considering a difference in processing conditions or workpieces.

One aspect of the present disclosure is a machine learning device configured to learn a positional relationship between a workpiece and an effective light-focusing position of a light-focusing optical system when a laser processing apparatus provided with the light-focusing optical system performs processing of the workpiece, the machine learning device comprising a data acquisition section configured to acquire a learning dataset, the learning dataset including data of a focal position command for the light-focusing optical system given to the laser processing apparatus and detection data of a physical quantity of light detected when a laser beam is emitted from a laser oscillator in accordance with a processing command including the focal position command; and a learning section configured to generate a learning model by using the learning dataset, the learning model representing correlativity between the said physical quantity and the said positional relationship.

Another aspect of the present disclosure is a laser processing system comprising a laser processing apparatus provided with a laser oscillator, a light-focusing optical system configured to focus a laser beam emitted from the laser oscillator, and a focal position control section configured to execute a movement control of a focal position of the light-focusing optical system; the machine learning device according to the above aspect; a light detector configured to detect a physical quantity of light sensed when the laser beam is emitted from the laser oscillator in accordance with a processing command including a focal position command; a positional relationship estimate section configured to estimate a positional relationship between a workpiece and an effective light-focusing position of the light-focusing optical system during processing of the workpiece, by using the learning model generated by the learning section and the physical quantity detected by the light detector; and a position command correction section configured to correct the focal position command given to the laser processing apparatus, based on the positional relationship estimated by the positional relationship estimate section.

Still another aspect of the present disclosure is a machine learning method configured to learn a positional relationship between a workpiece and an effective light-focusing position of a light-focusing optical system when a laser processing apparatus provided with the light-focusing optical system performs processing of the workpiece, the machine learning method comprising the steps, executed by a processor, of acquiring a learning dataset, the learning dataset including data of a focal position command for the light-focusing optical system given to the laser processing apparatus and detection data of a physical quantity of light detected when a laser beam is emitted from a laser oscillator in accordance with a processing command including the focal position command; and generating a learning model by using the learning dataset, the learning model representing correlativity between the said physical quantity and the said positional relationship.

In the machine learning device according to one aspect, it is possible to learn a positional relationship between a workpiece and an effective light-focusing position of a light-focusing optical system when a laser processing apparatus provided with the light-focusing optical system performs processing of the workpiece, in connection with the physical quantity of light detected depending on differences in processing conditions or workpieces. When performing processing steps, the physical quantity of light is detected in the same way as in the learning steps, so that it is possible to estimate the positional relationship between the workpiece and the effective light-focusing position at the time of light detection (i.e., at the time of performing the processing steps) based on the detected physical quantity and the learning model while considering the differences in processing conditions or workpieces.

In the laser processing system according to the other aspect, when performing processing steps, the position command correction section corrects the focal position command based on the positional relationship estimated by the positional relationship estimate section, so that it is possible to improve the precision of correction of the focal position offset of the laser processing apparatus, in synergy with the aforementioned effects of the machine learning device. As a result, the quality of the laser processing performed by the laser processing apparatus is prevented from being deteriorated, and the life-span of components of the light-focusing optical system is improved.

The machine learning method according to the still other aspect provides effects equivalent to the aforementioned effects of the machine learning device.

BRIEF DESCRIPTION OF THE DRAWINGS

The objects, features and advantages of the present disclosure will become more apparent from the following description of embodiments in connection with the accompanying drawings, wherein.

DETAILED DESCRIPTION

Figure 1:
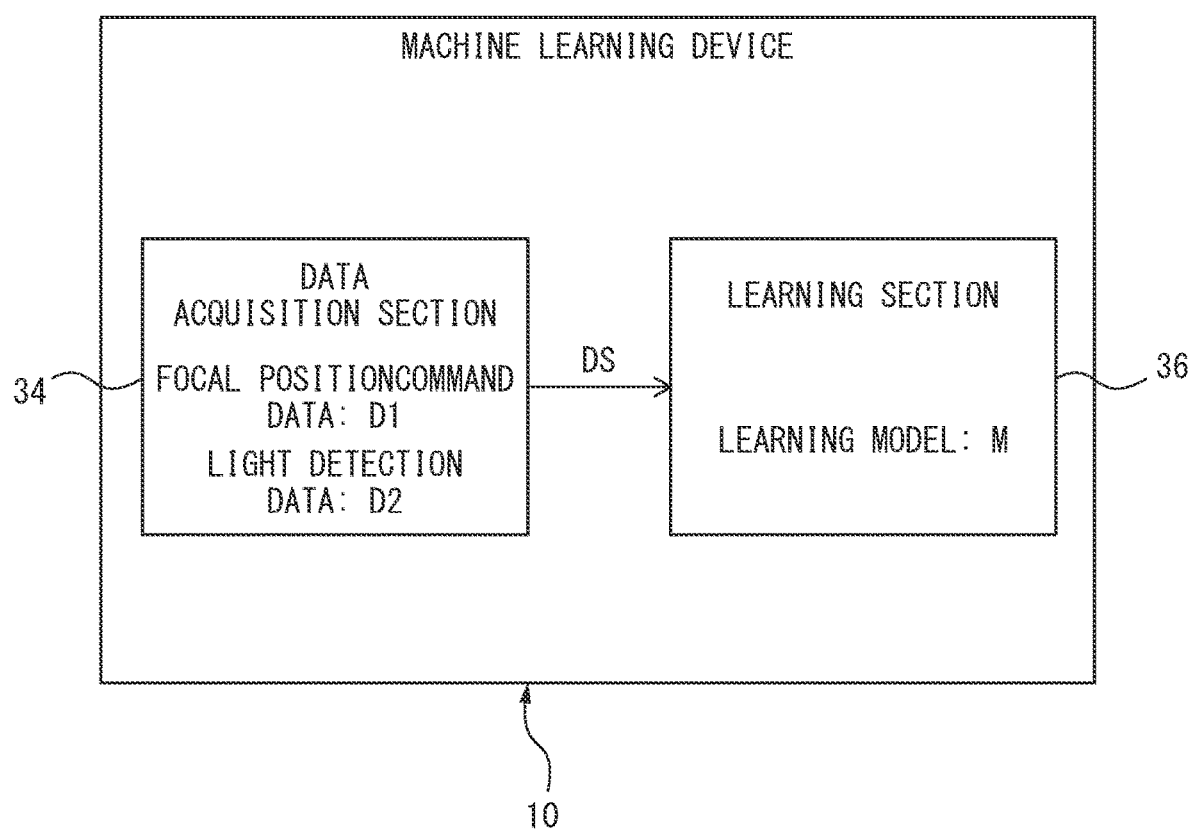
FIG. 1 is a functional block diagram showing a machine learning device according to one embodiment.

Embodiments of the present disclosure will be explained below with reference to the accompanying drawings. Throughout the drawings, corresponding components are denoted by common reference numerals or signs.

Figure 2:
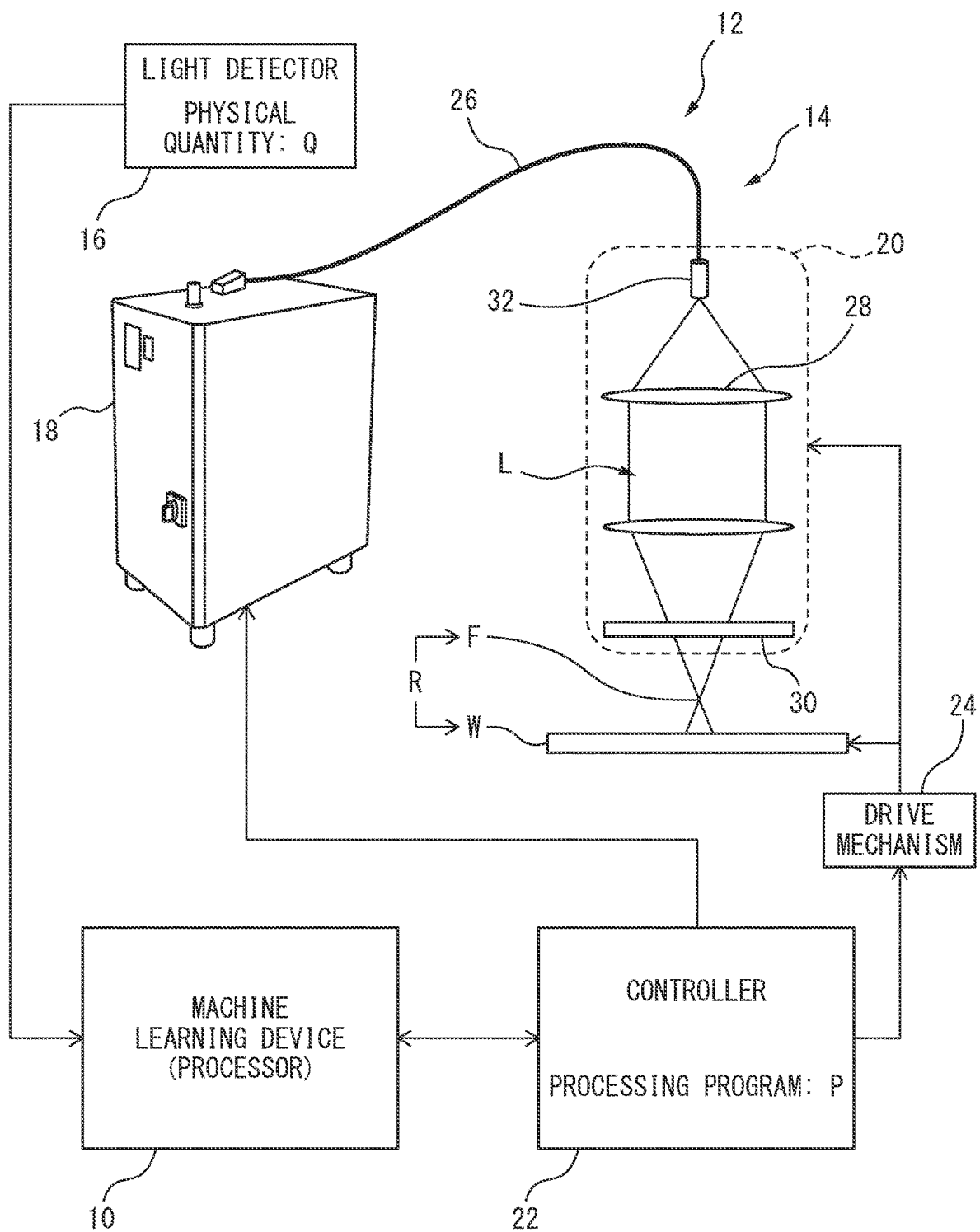
FIG. 2 is an illustration schematically showing the overall configuration of a laser processing system.

FIG. 1 shows a machine learning device 10 according to one embodiment by functional blocks. FIG. 2 schematically shows the overall configuration of a laser processing or machining system 12 provided with the machine learning device 10. First, referring to FIG. 2, the basic configuration of the laser processing system 12 will be explained.

The laser processing system 12 includes the machine learning device 10, a laser processing or machining apparatus 14, and a light detector 16. The laser processing apparatus 14 is provided with a laser oscillator 18, a light-focusing optical system 20 configured to focus the laser beam L emitted from the laser oscillator 18, a controller 22 configured to execute an oscillation control of the laser oscillator 18 and a movement control of a focal position of the light-focusing optical system 20 relative to the workpiece W, and a drive mechanism 24 configured to make the light-focusing optical system 20 and the workpiece W move relative to each other based on a command from the controller 22. The laser processing apparatus 14 may be further provided with other not-shown components, such as a processing head accommodating the light-focusing optical system 20, a gas supply mechanism for supplying assist gas to the processing head, a worktable carrying a workpiece W, etc.

The laser oscillator 18 is provided with, e.g., a fiber laser type resonator (not shown). The laser beam L amplified by the resonator is introduced to the processing head through a transmission means 26 composed of, e.g., an optical fiber. The laser oscillator 18 may adopt various oscillation systems, such as a $CO_2$ laser, etc. The transmission means 26 may have various configurations using a light guide, a reflecting mirror, etc.

The light-focusing optical system 20 includes a lens 28 and a protective window 30, both built in a processing head. In the case where the transmission means 26 is composed of an optical fiber, the light-focusing optical system 20 further includes an optical component 32, such as a collimator, etc., attached to the distal end of the optical fiber. The reflecting mirror, etc., used as the transmission means 26, also can be deemed as a part of the light-focusing optical system 20.

The drive mechanism 24 can move, e.g., the processing head and the worktable relative to each other in a direction along the surface of the workpiece W or selectively in a direction toward and away from each other. Further, the drive mechanism 24 can move, e.g., the lens 28 of the light-focusing optical system 20 in the processing head. The drive mechanism 24 may have, e.g., at least three control axes (X-axis, Y-axis and Z-axis) in a Cartesian 3-axis coordinate system. In this case, the each control axis can be set at either or both of the light-focusing optical system 20 (or the processing head) and the workpiece W (or the worktable).

The controller 22 is configured as, e.g., a numerical control unit. The controller 22 can interpret a given processing program P and send a command to a controlled object, such as the laser oscillator 18, the drive mechanism 24, etc., so as to make the laser oscillator 18 oscillate a laser beam under desired oscillation conditions (power, frequency, pulse width, etc.), or make the light-focusing optical system 20 operate under desired operating conditions (focal position, spot diameter, processing speed, assist gas pressure, etc.). The controller 22 can make, e.g., at least three control axes (X-axis, Y-axis, Z-axis) of the drive mechanism 24 respectively operate based on a focal position command in the Cartesian 3-axis coordinate system, and thereby three dimensionally move the focal point of the light-focusing optical system 20 and the surface of the workpiece W relative to each other.

Further, the focal position command may be composed of a command value of a relative position relative to the workpiece W, or a command value of an absolute position relative to the origin defined at an arbitrary location. The light detector 16 detects light sensed, in a processing environment including the laser processing apparatus 14 and the workpiece W, at a time when the workpiece W is irradiated with the laser beam L emitted from the laser oscillator 18 and propagating through the light-focusing optical system 20. The light to be detected by the light detector 16 may be reflected light of the laser beam L with which the workpiece W is irradiated, or may be resulting light generated by irradiating the workpiece W with the laser beam L (e.g., plasma, heat emission, etc.). The physical quantity Q of light to be measured by the light detector 26 may be light intensity represented by, e.g., radiant flux (W), radiant energy (J), light quantity ($1m.$$), illuminance (W/m$^2$), etc., or may be a spectrum (i.e., light intensity distribution) as a function of optical frequency. In a configuration where the light detector 16 detects reflected light of the laser beam L, a reflected light sensor equipped in the laser processing apparatus 14 for the purpose of protecting the laser oscillator 18 may be utilized as the light detector 16.

In the laser processing apparatus 14, sometimes the focal distance of the light-focusing optical system 20 changes due to disturbances such as heat associated with laser beam irradiation and the actual effective light-focusing position F of the light-focusing optical system 20 thereby deviates from the designed focal position. If the effective light-focusing position of the light-focusing optical system 20 deviates from the focal position thereof at the time of performing processing steps, a positional relationship R between the workpiece W and the effective light-focusing position F is liable to become different from a target positional relationship determined by a processing program P and to affect the quality of the laser processing.

The machine learning device 10 has a configuration for self-learning, by a so-called "machine learning", the positional relationship R between the workpiece W and the effective light-focusing position F of the light-focusing optical system 20 at a time when the laser processing apparatus 14 having the light-focusing optical system 20 processes the workpiece W, and includes hardware, such as a processor of a computer (e.g., a central processing unit (CPU)), for running software defining various learning algorithms. The positional relationship R learned by the machine learning device 10 corresponds to a barometer showing a current state of the focal position offset of the laser processing apparatus 14. According to a configuration where the machine learning device 10 generates a learning model M representing the positional relationship R in connection with the physical quantity Q of light, it becomes possible to estimate and correct the focal position offset with a high degree of precision based on the learning model M when performing the processing steps. Now, the configuration of the machine learning device 10 will be explained with reference to FIGS. 1 and 2.

As shown in FIG. 1 by functional blocks, the machine learning device 10 includes a data acquisition section 34 configured to acquire a learning dataset DS, the learning dataset DS including data D1 of a focal position command for the light-focusing optical system 20 given to the laser processing apparatus 14 and detection data D2 of a physical quantity Q of light detected when a laser beam L is emitted from the laser oscillator 18 in accordance with a processing command including the focal position command; and a learning section 36 configured to generate a learning model M by using the learning dataset DS, the learning model M representing correlativity between the detected physical quantity Q of light and the positional relationship R. The machine learning device 10 may have a configuration of a computer, such as a personal computer. Alternatively, the machine learning device 10 may be installed in the aforementioned controller 22.

The data acquisition section 34 may be configured as, e.g., a processor of a computer (or one function of the processor), or alternatively, may be configured as, e.g., a program for allowing a processor of a computer to function (or one part of the program). In the learning dataset DS acquired by the data acquisition section 34, the data D1 of the focal position command (hereinafter referred occasionally to as "focal position command data D1") is acquired from the processing program P given to the controller 22. The focal position command data D1 corresponds to a command value of a focal position (a relative or absolute position) instructed to the laser processing apparatus 14 provided with the light-focusing optical system 20 in which it is assumed that a focal position offset has not occurred.

Further, in the learning dataset DS, the detection data D2 of the physical quantity Q of light (hereinafter referred occasionally to as "light detection data D2") is acquired from the light detector 16 as an actual measured value of light sensed in a processing environment at an instant when the workpiece W is irradiated with the laser beam L under the processing command including the focal position command of the focal position command data D1. The light detection data D2 is acquired from the light detector 16 as various different values (physical quantities Q) depending on differences in processing conditions, such as oscillation conditions (power, frequency, pulse width, etc.) of the laser oscillator 18 instructed by the processing program P, operating conditions (focal position, spot diameter, processing speed, assist gas pressure, etc.) of the light-focusing optical system 20, and so on; and/or differences in the types of the workpieces W (shape, surface condition, material, temperature, etc.).

The learning section 36 may be configured as, e.g., a processor of a computer (or one function of the processor), or alternatively, may be configured as, e.g., a program for allowing a processor of a computer to function (or one part of the program). The learning section 36 performs arithmetic processing for learning the positional relationship R between the workpiece W and the effective light-focusing position F of the light-focusing optical system 20, in accordance with an arbitrary learning algorithm generically referred to as a "machine learning".

As explained above, the light detection data D2 acquired by the data acquisition section 34 represents the physical quantity Q of light depending on the processing conditions including the focal position or the type of the workpiece W. In particular, it is believed that the focal position command data D1 and the light detection data D2 are linearly correlated with each other. Further, it is assumed that the processing conditions other than the focal position or the type of the workpiece W have some sort of correlativity with the light detection data D2. The learning section 36 learns the correlativity between the data D1 and D2 based on the focal position command data D1 and the light detection data D2 detected in response to the focal position command. Such a learning cycle is repeatedly executed for a wide variety of types of workpieces W under a wide variety of processing conditions, so that the learning section 36 can generate the learning model M representing the correlativity between the physical quantity Q of light and the positional relationship R.

For example, even when workpieces W made of the same material and having the same dimensions are irradiated with a laser beam under the same processing conditions, the detected physical quantities Q of light will differ from each other if the shapes, conditions or temperatures of the irradiated surfaces of the workpieces W are different from each other. Further, when substantially the same types of workpieces W are irradiated with a laser beam L under various differing processing conditions, various differing physical quantities Q of light will be detected even if the focal position is the same. Therefore, by using a wide variety of learning datasets DS acquired when a plurality of types of workpieces W different in shapes, surface conditions, materials, temperatures, etc., are irradiated with a laser beam L under a plurality of processing conditions involving various differing oscillation conditions of the laser oscillator 18 or various differing operating conditions of the light-focusing optical system 14, it becomes possible to generate a highly reliable learning model M.

Even if the correlativity between the physical quantity Q of light and the positional relationship R is substantially unknown at the time of starting the learning, the learning section 36 gradually interprets the correlativity as the learning progresses. If the correlativity between the physical quantity Q of light and the positional relationship R is interpreted to a certain reliable level, it becomes possible to use the learning model M generated by the learning section 36 for performing a behavior choice such that a command value at a current state (i.e., before correction) of the focal position commanded by the processing program P should be corrected to what extent with respect to the laser processing apparatus 14 provided with the light-focusing optical system 20 in a current state (i.e., with a potential change in a focal distance due to disturbances such as heat). In other words, along with the progress of a learning algorithm, the learning section 16 can make the learning model M representing the correlativity between the physical quantity Q of light and the positional relationship R gradually approach an optimal solution. Note that, regardless of whether the command value of the focal position command data D1 is a relative or absolute position, the positional relationship R learned by the learning section 36 may be expressed by a relative position between the workpiece W and the effective light-focusing position F or may be expressed by an absolute position of the effective light-focusing position F.

Figure 3:
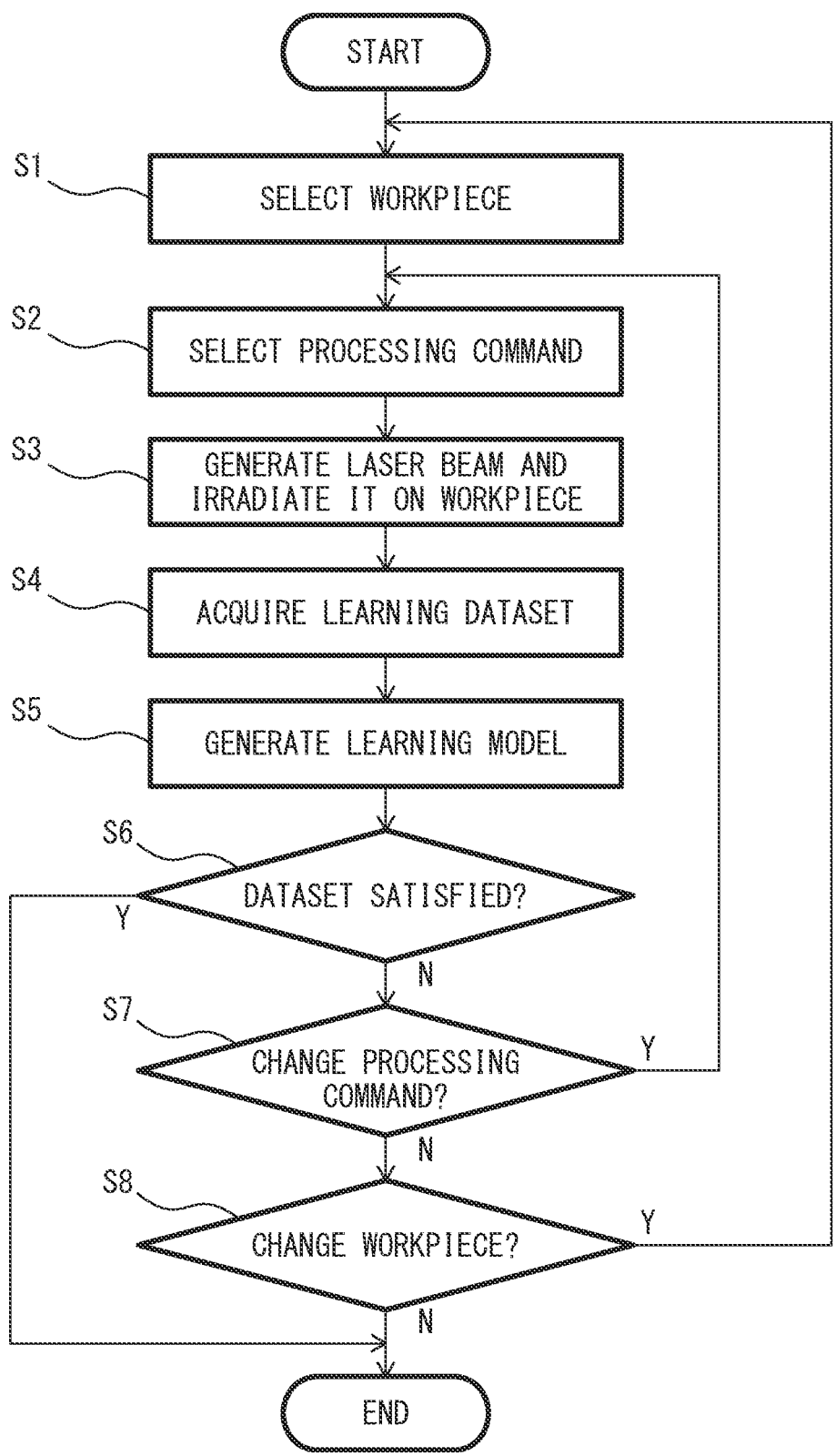
FIG. 3 is a flow chart showing a machine learning method according to one embodiment.

FIG. 3 shows a flow chart of a machine learning method according to one embodiment executed by the machine learning device 10. In the illustrated learning flow, at step S1, a workpiece W used for learning is selected from a plurality of types of workpieces W differing in current conditions, such as shapes, surface conditions, materials, temperatures, etc. The workpiece W to be selected may be a workpiece W actually laser-processed by performing processing steps, or may be a workpiece W separately prepared for the learning steps. At step S2, a processing command for laser-processing a workpiece W to be learned is selected from various processing commands satisfying processing conditions (oscillation conditions of laser oscillator 18; operating conditions of light-focusing optical system 20) which can be met by the laser processing apparatus 14. The processing command to be selected may be a processing command for actually laser-processing the workpiece W by performing the processing steps, or may be a processing command separately prepared for the learning steps. The selections at steps S1 and S2 can be optionally performed by an operator operating the laser processing system 12 to execute the learning by the machine learning device 10.

In accordance with the selected processing command, at step S3, the laser oscillator 18 is made to emit a laser beam L, and the workpiece W to be learned is irradiated with the laser beam L passing through the light-focusing optical system 20. Step S3 is performed by the operator of the laser processing system 12, who places the workpiece W to be learned on the worktable and gives a processing program P describing the selected processing command to the controller 22. At step S4, data D1 of the focal position command for the light-focusing optical system 20 given to the laser processing apparatus 14 and detection data D2 of the physical quantity Q of light detected when a laser beam is emitted from the laser oscillator 18 in accordance with the processing command including a focal position command, are acquired as a learning dataset DS. In step S4, the data acquisition section 34 of the machine learning device 10 acquires the focal position command data D1 from the processing program P, and acquires the light detection data D2 from the light detector 16.

Using the acquired learning dataset DS, at step S5, a learning model M representing the correlativity between the physical quantity Q of light and the positional relationship R is generated. In step S5, the learning section 36 of the machine learning device 10 learns the correlativity between the focal position command data D1 and the light detection data D2 in accordance with the learning algorithm, and as the result thereof, generates the learning model M. At step S6, the operator judges whether the learning dataset DS for generating the learning model M is satisfactory, that is, whether the learning model M has reached a reliable level. If it is judged that the learning dataset DS is satisfactory, the learning flow is ended.

If it is judged that the learning dataset DS is not satisfactory, the operator judges, at step S7, whether the processing command should be changed. If it is judged that the processing command should be changed, the routine returns to step S2, a processing command different from the previous command is selected, and the subsequent learning flow is continued. If it is judged that the processing command should not be changed, the operator judges, at step S8, whether the workpiece W should be changed. If it is judged that the workpiece W should be changed, the routine returns to step S1, a workpiece W different from the previous workpiece is selected, and the subsequent learning flow is continued. If it is judged that the workpiece W should not be changed, the learning flow is ended in a state where the learning model M has not reached a reliable level.

The above learning flow is executed at least by using a plurality of different learning datasets DS including a plurality of different focal position command data D1. The number of different focal position command data D1 or the pitch between positions of the latter is set depending on a reliability (precision and accuracy) required for the learning model M. The number of the light detection data D2 combined respectively with the focal position command data D1 (depending on processing conditions other than the focal position or difference in workpieces W) is determined while considering time and cost allowed for the learning, in addition to the reliability required for the learning model M.

As explained above, according to the machine learning device 10, it is possible to learn the positional relationship R between the workpiece W and the effective light-focusing position F of the light-focusing optical system 20 at the time when the laser processing apparatus 14 provided with the light-focusing optical system 20 performs processing of the workpiece W, in connection with the physical quantity Q of light detected depending on the differences in processing conditions or workpieces W. When performing the processing steps, the physical quantity Q of light is detected in the same way as the learning steps, so that it is possible to estimate the positional relationship R between the workpiece W and the effective light-focusing position F at the time of detection of light (i.e., at the time of performing the processing steps) based on the detected physical quantity and the learning model M while considering the differences in processing conditions or workpiece W. Therefore, in the case where a focal position offset occurs in the light-focusing optical system 20 due to disturbances such as heat associated with laser beam irradiation, it is possible to correct a focal position command for the processing steps so as to compensate for the focal position offset, based on the positional relationship R estimated on the basis of the learning model M. If the focal position command is properly corrected, it is possible to prevent the quality of the laser processing performed by the laser processing apparatus 14 from being deteriorated. Further, the focal position offset is canceled and the laser processing is continuously performed with the effective light-focusing position F set as a target value, so that it is possible to reduce defacement or overheating of components of the light-focusing optical system 20 (in particular, lens or protective window) and improve the life-span of the components.

When performing the processing steps, if a workpiece W identical to the workpiece W used when the learning model M is generated (i.e., used for the learning steps) is processed by a processing command identical to the processing command (except for the focal position command) used for the learning steps, it is possible to accurately estimate the positional relationship R at the time of performing the processing steps by using the learning model M. Even if the processing command or workpiece W in the actual processing steps is different from that in the learning steps, it becomes possible to estimate the positional relationship R at the time of performing the processing steps by repeatedly executing the aforementioned learning flow so as to improve the reliability of the learning model M.

One measure for improving the reliability of the learning model M is using a plurality of types of workpieces W differing in shapes, surface conditions, materials, temperatures, etc., for the learning steps as already explained. As another measure, the surface of a workpiece W is previously processed by the laser processing apparatus 14 before acquiring learning dataset DS, and a learning model M is generated by using light detection data D2 acquired when the pre-processed surface is irradiated with a laser beam L. According to this measure, the surface conditions of the workpiece W are made uniform in advance by a surface processing, so that it is possible to reduce noise in the light detection data D2 and improve the reliability of the learning model M.

As a further measure for improving the reliability of the learning model M, a plurality of condition groups are prepared by grouping a wide variety of processing conditions or workpieces W into several groups each including processing conditions or workpieces W partly analogous to each other and the learning steps are executed for each of the condition groups, so as to generate a plurality of types of learning models M respectively corresponding to the condition groups. When performing processing steps, a learning model M corresponding to the condition group to which the processing conditions or workpiece W in the processing steps belongs, is selected from the plurality of types of learning models M, so that it is possible to accurately estimate the positional relationship R at the time of performing the processing steps.

In the machine learning device 10 having the aforementioned configuration, a learning method executed by the learning section 36 is not particularly limited. For example, supervised learning, unsupervised learning, reinforcement learning and other learning methods known as "machine learning" can be adopted. Supervised learning is a technique in which a large amount of known learning datasets, each including input data and output data associated therewith (generally referred to as "teacher data", "label", etc.), are given in advance and features implying correlativity between the input data and the output data based on the known learning datasets are identified, so as to generate a correlativity model (i.e., the learning model M, in the machine learning device 10) used for estimating an output required with respect to a new input. On the other hand, in unsupervised learning or reinforcement learning, a learning process is started from a state where a relationship between an input and an output is unknown.

Figure 4:
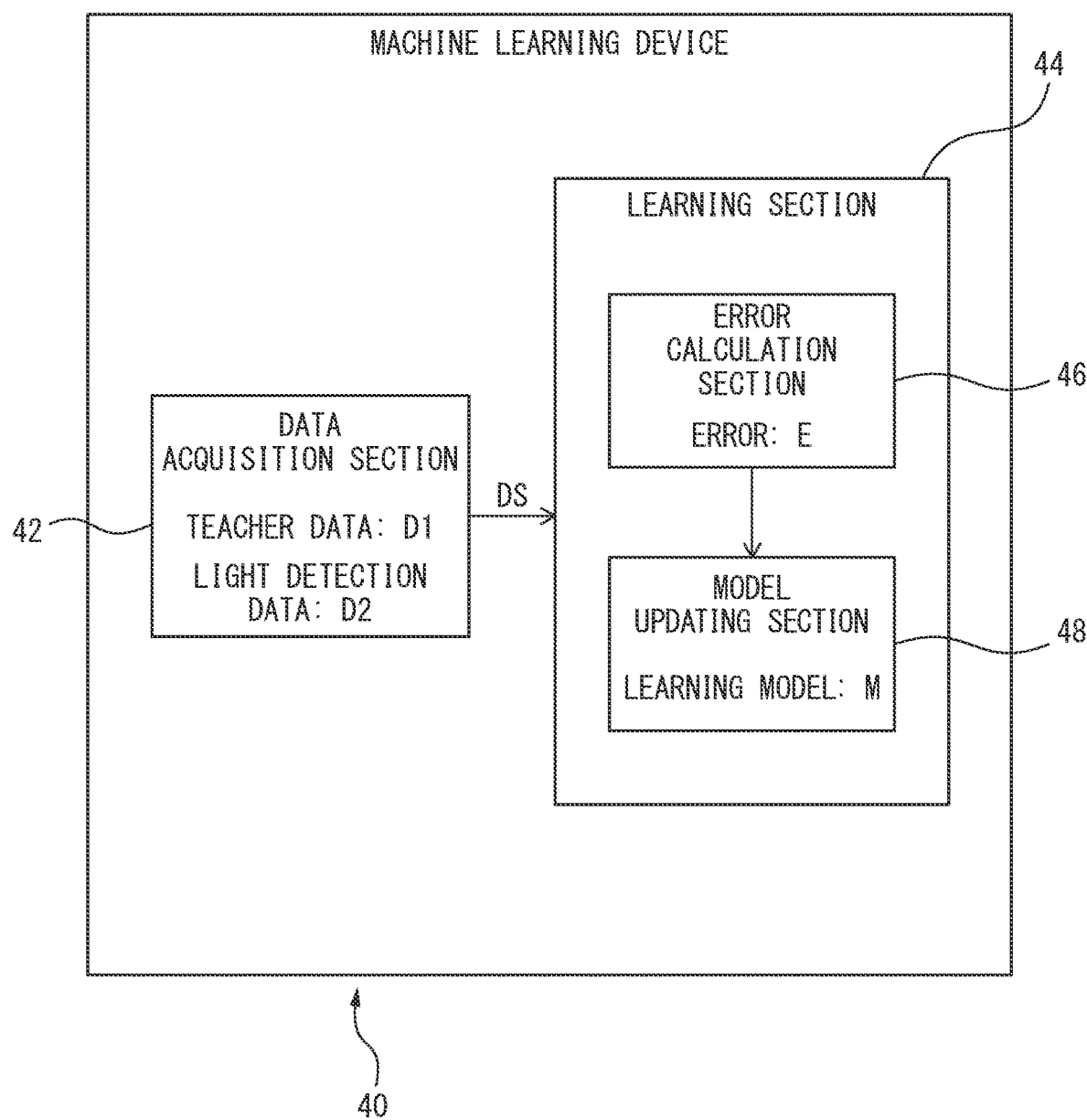
FIG. 4 is a functional block diagram showing a machine learning device according to another embodiment.

FIG. 4 shows a machine learning device 40 according to another embodiment of the present disclosure by functional blocks, which executes supervised learning. The configuration of the machine learning device 40 will be explained below with reference to FIG. 4 and FIG. 2. Note that the machine learning device 40 has a configuration similar to that of the aforementioned machine learning device 10, except for the execution of the supervised learning as the learning method, and therefore explanations of the corresponding components are suitably omitted.

The machine learning device 40 includes a data acquisition section 42 configured to acquire a learning dataset DS which includes data D1 of a focal position command for the light-focusing optical system 20 given to the laser processing apparatus 14 and detection data D2 of a physical quantity Q of light detected when a laser beam L is emitted from the laser oscillator 18 in accordance with a processing command including the focal position command; and a learning section 44 configured to generate a learning model M by using the learning dataset DS, the learning model M representing the correlativity between the detected physical quantity Q of light and the positional relationship R. The learning section 44 learns the correlativity between the light detection data D2 and the teacher data D1, based on the known learning dataset DS in which the focal position command data D1 is used as teacher data D1. The learning model M is generated by repeatedly executing the learning cycle by using a wide variety of known learning datasets DS.

The learning section 44 is provided with an error calculation section 46 configured to compare a currently generated learning model M with a correlativity feature identified between the teacher data D1 and the light detection data D2 based on the known learning dataset DS acquired subsequently, so as to calculate error E defined between the learning model M and the correlativity feature; and a model updating section 48 configured to update the learning model M so as to reduce the error E. The learning section 44 is configured to deepen the learning of the positional relationship R with the model updating section 48 repeatedly updating the learning model M, and thereby improve the reliability of the generated learning model M. In the learning flow shown in FIG. 3, at step S5, the learning section 44 executes updating the learning model M.

The machine learning device 40 executing the supervised learning produces an effect such that, in addition to the effects exhibited by the aforementioned machine learning device 10, it is possible to improve learning efficiency by using the known learning dataset DS and rapidly generate a highly reliable learning model M. Note that the laser processing system 12 shown in FIG. 2 may include the machine learning device 40 instead of the machine learning device 10.

The machine learning device 40 may execute semi-supervised learning instead of the supervised learning. In the semi-supervised learning, based on the known learning dataset DS including the teacher data D1 and the light detection data D2, focal position command data D1 different from the teacher data D1 is intentionally associated with light detection data D2 other than that of the known learning dataset DS so as to obtain a new learning dataset DS. Even when the number of known learning datasets DS prepared in advance is small, it is possible to deepen the learning of the positional relationship R. Alternatively, the device may be configured so that, at the initial stage of learning, the learning section 44 executes the supervised learning and, at the stage where the learning has proceeded to a certain degree, the learning section 44 executes unsupervised learning or reinforcement learning, with the learning model M obtained by the supervised learning being used as an initial value.

In the machine learning device 10 or 40, the data acquisition section 34 or 42 may be configured to acquire the light detection data D2 as data of instantaneous value of light detected at a predetermined timing, or acquire the light detection data D2 as time-series data of light detected for a predetermined time period. When the time-series data of light is detected as the light detection data D2, it is possible to improve precision of learning.

Figure 5A:
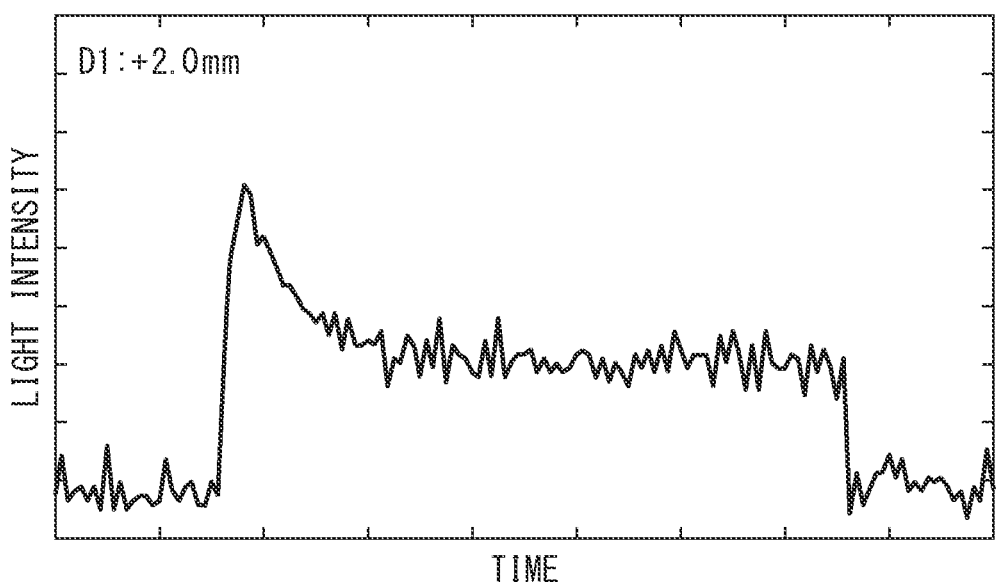
FIG. 5A is an illustration showing one example of light detection data.
Figure 5B:
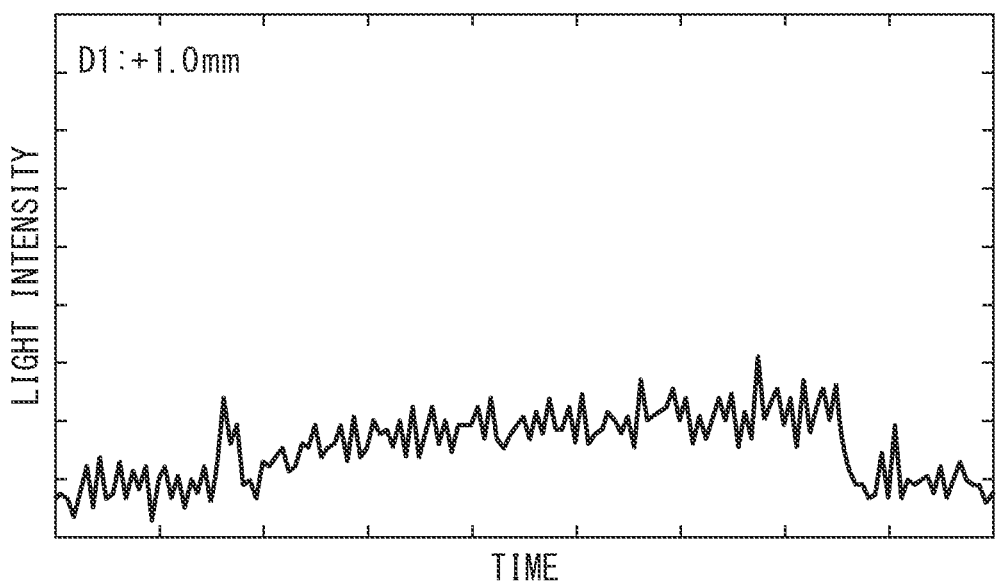
FIG. 5B is an illustration showing another example of light detection data.
Figure 5C:
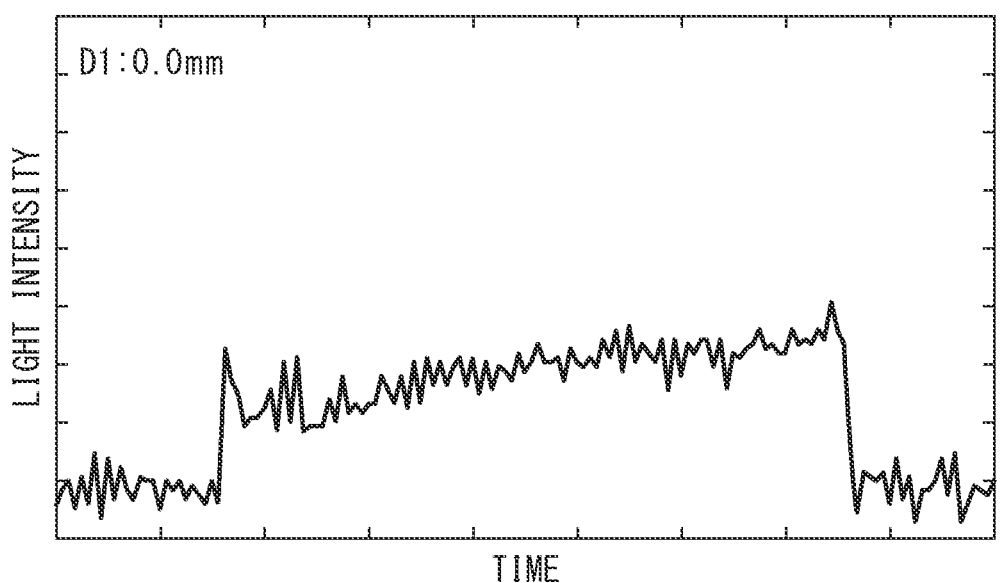
FIG. 5C is an illustration showing still another example of light detection data.
Figure 5D:
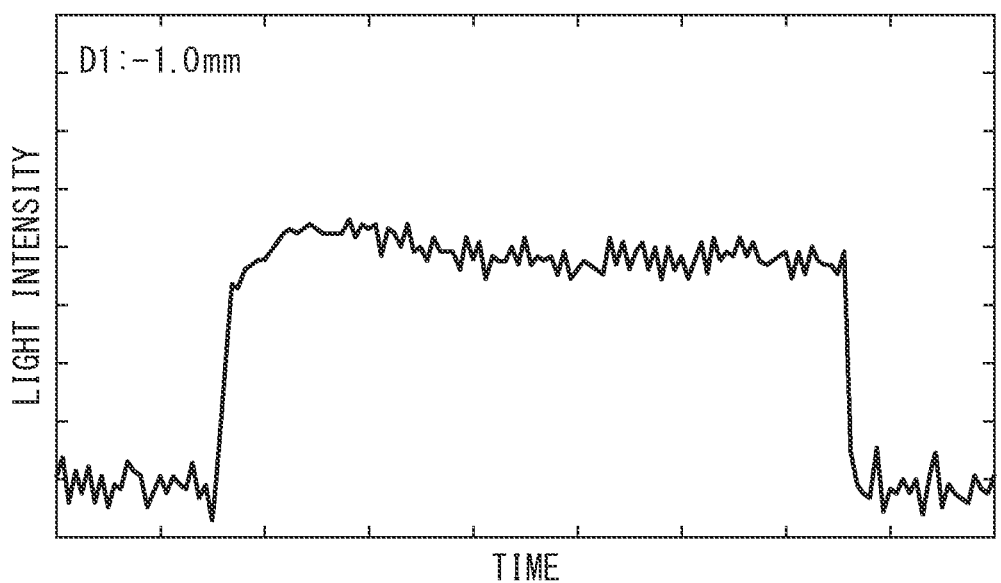
FIG. 5D is an illustration showing still another example of light detection data.
Figure 5E:
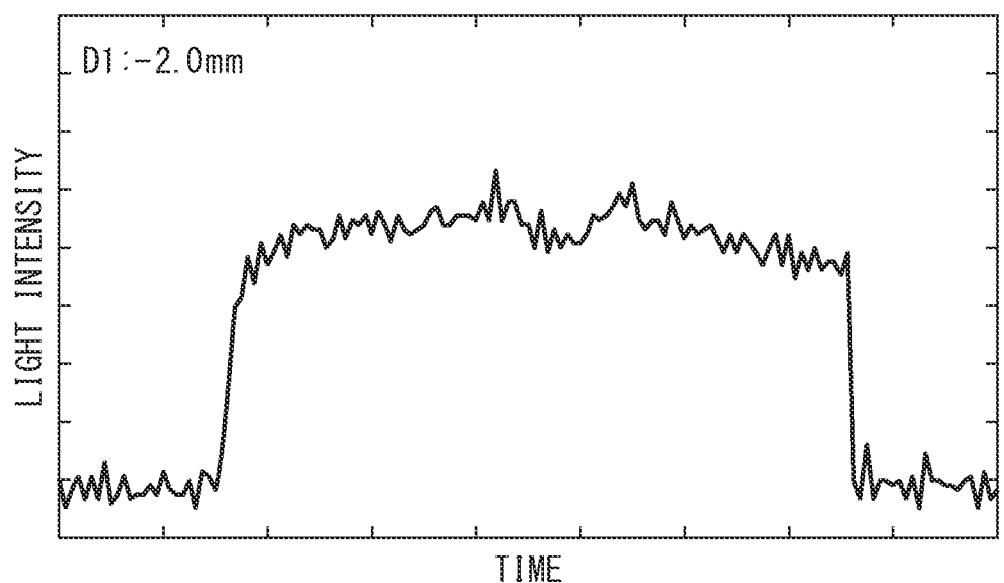
FIG. 5E is an illustration showing still another example of light detection data.

FIGS. 5A to 5E illustrate light detection data D2 as time-series data acquired by the data acquisition section 34, 42. In each illustration, the abscissa shows "time" while the ordinate shows "light intensity". The detection data D2 of FIGS. 5A to 5E represent light intensities (i.e., physical quantities Q of light) actually measured in association with mutually different focal position command data D1 (or teacher data D1). Mutually identical processing conditions, other than the focal position, and mutually identical type of workpiece W are provided. For example, when the focal position command is a relative-position command value of a focal point relative to an irradiated surface of the workpiece W, the focal position command data D1 (or teacher data D1) associated with the respective light detection data D2 is: +(plus) 2.0 mm in FIG. 5A; +(plus) 1.0 mm in FIG. 5B; 0.0 mm in FIG. 5C; −(minus) 1.0 mm in FIG. 5D; and −(minus) 2.0 mm in FIG. 5E. A plus sign means the focal position is on the near side of the irradiated surface of the workpiece W as seen from the light-focusing optical system 20, while a minus sign means the focal position is on the far side of the irradiated surface of the workpiece W as seen from the light-focusing optical system 20. FIG. 5C shows detection data D2 at a time when the laser beam L is focused at the irradiated surface of the workpiece W.

As illustrated, the focal position command data D1 (or teacher data D1) and the light detection data D2 have a one-to-one or linear correlativity. It will be understood by comparing the respective light detection data D2 of FIGS. 5A to 5E that, if the data of instantaneous value of light detected at a predetermined time are acquired as the light detection data D2, the one-to-one correlativity of data D1 and D2 is likely to become unclear. In contrast, as will be understood from FIGS. 5A to 5E, if the time-series data of light detected over a predetermined time period are acquired as the light detection data D2, the difference in waveform of the light detection data D2 of the respective focal position command data D1 (or teacher data D1) is apparent, so that the one-to-one correlativity of data D1 and D2 is clearly interpreted. As a result, it is possible to improve the precision of learning executed by the learning section 36, 44 and thereby generate a highly reliable learning model M.

When performing the processing steps, in a case where the detection data D2 of physical quantity Q of light resulting from irradiating the workpiece W with a laser beam L is substantially the same as, e.g., the light detection data D2 shown in FIG. 5A, the positional relationship R between the workpiece W and the effective light-focusing position F at the time of light detection (i.e., at the time of performing the processing steps) is estimated as +2.0 mm (relative position). If it is assumed that the focal position command at this time is +1.0 mm (relative position), it is possible to correct the subsequent focal position command by −1.0 mm, and thereby to make the effective light-focusing position F during the processing steps accurately conform to the focal position command.

In the configuration where the time-series data of light is acquired as the light detection data D2, the learning section 36, 44 can process the time-series data by any one of normalization, smoothing, Fourier transformation, function approximation and differentiation. With such a prior processing to be executed, it becomes possible for the learning section 36, 44 to generate the learning model M by using light detection data D2 suitable for learning, and thereby to improve learning efficiency.

In the machine learning device 10 or 40, the data acquisition section 34 or 42 may be configured to acquire the light detection data D2 as a plurality of data detected at a plurality of different parts of the light sensed in a processing environment at a time when a workpiece W is irradiated with a laser beam L. For example, the laser processing system 12 may have a configuration wherein light detectors 16 are provided at a plurality of different positions, and reflected light of the laser beam L with which the workpiece W is irradiated and/or resulting light (plasma, heat emission, etc.) generated by irradiating the workpiece W with the laser beam L are simultaneously detected at the different positions. According to the configuration wherein a plurality of light detection data D2 simultaneously detected at the different parts of the same light are acquired, it is possible to improve the precision of learning.

Figure 6A:
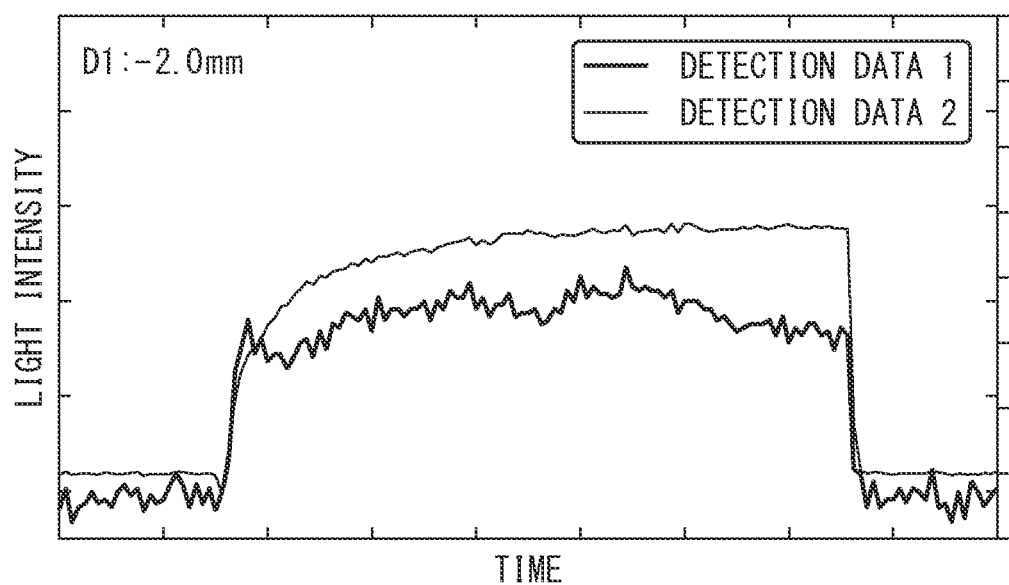
FIG. 6A is an illustration showing still another example of light detection data.
Figure 6B:
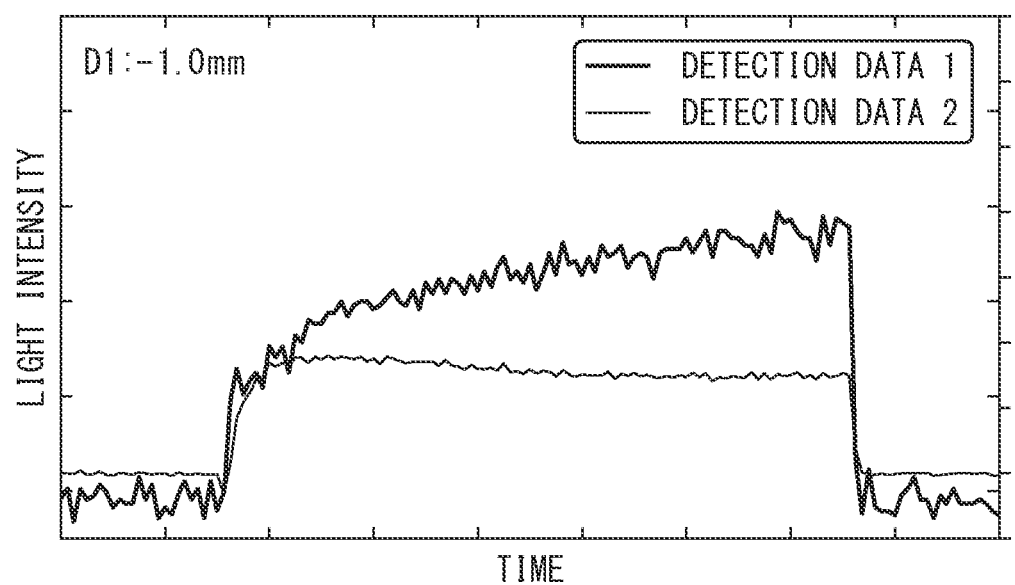
FIG. 6B is an illustration showing still another example of light detection data.
Figure 6C:
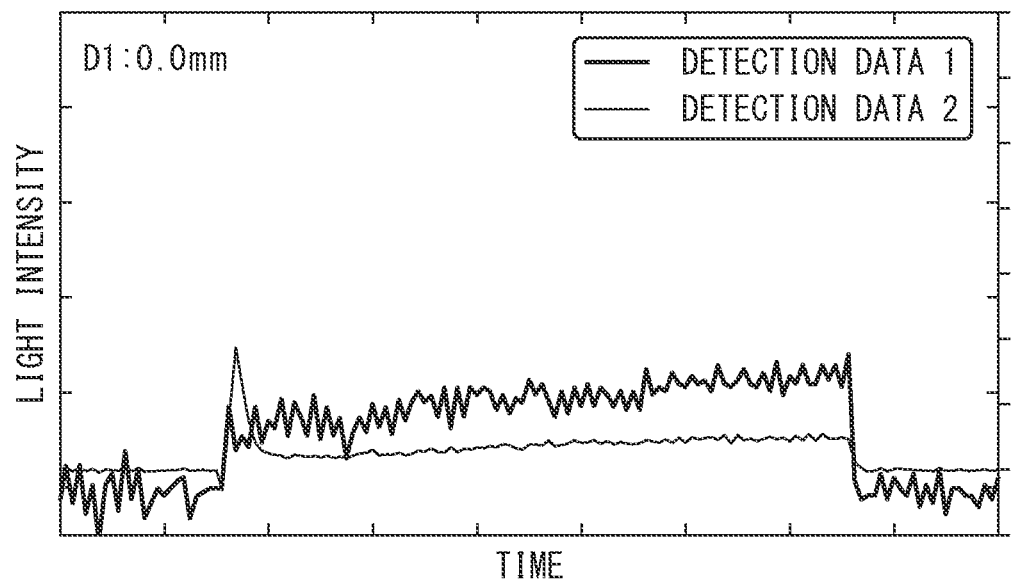
FIG. 6C is an illustration showing still another example of light detection data.
Figure 6D:
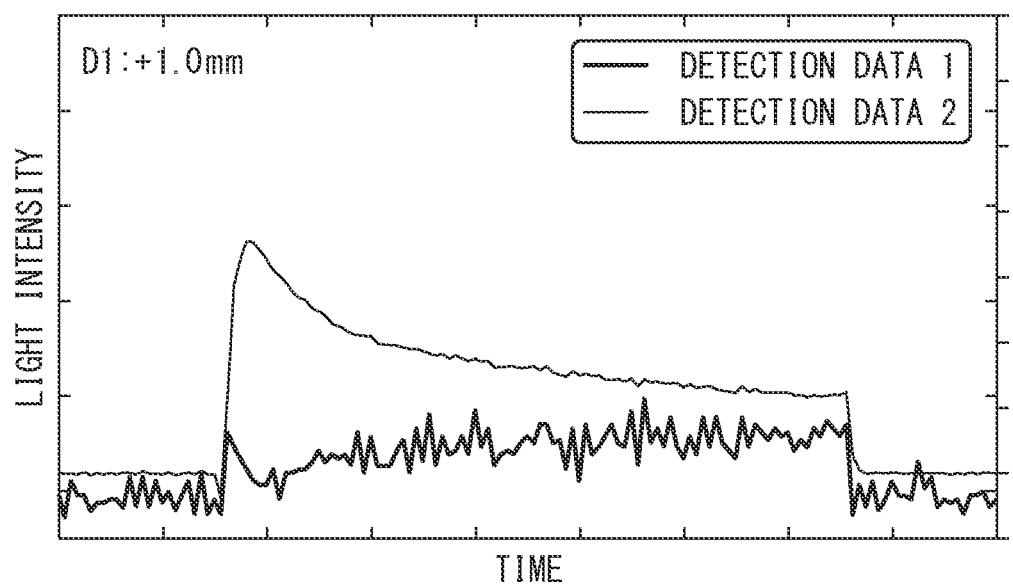
FIG. 6D is an illustration showing still another example of light detection data.
Figure 6E:
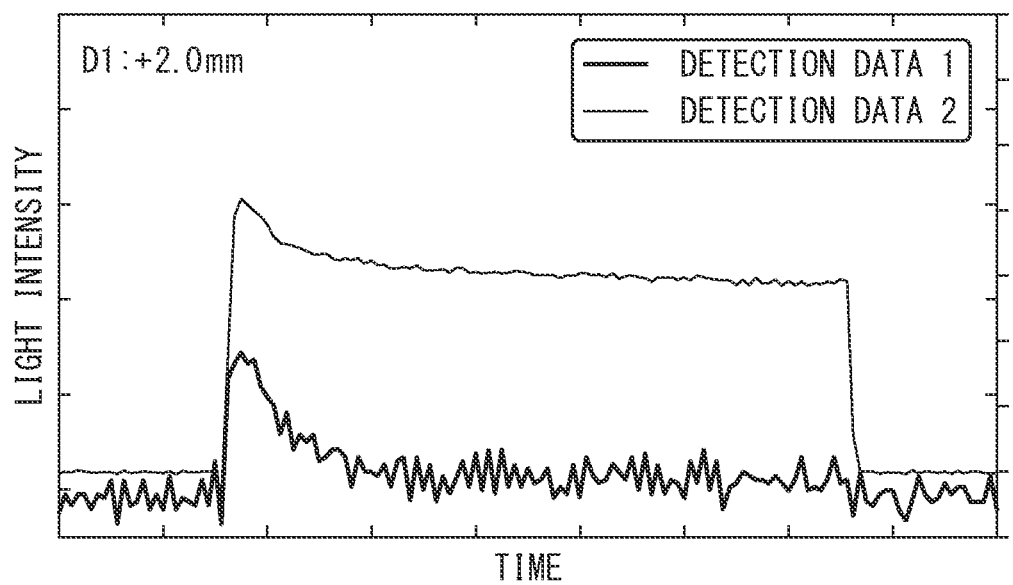
FIG. 6E is an illustration showing still another example of light detection data.

FIGS. 6A to 6E illustrate light detection data D2 as time-series data acquired by the data acquisition section 34, 42, each illustration showing detection data D2 simultaneously detected at two locations of the same light (i.e., detection data 1 and 2). In each illustration, the abscissa shows "time" while the ordinate shows "light intensity". The detection data D2 of FIGS. 6A to 6E represent light intensities (i.e., physical quantities Q of light) actually measured in association with mutually different focal position command data D1 (or teacher data D1). Mutually identical processing conditions, other than the focal position, and mutually identical type of workpiece W are provided. For example, when the focal position command is a relative-position command value of a focal point relative to an irradiated surface of the workpiece W, the focal position command data D1 (or teacher data D1) associated with the respective light detection data D2 (detection data 1 and 2) is: −(minus) 2.0 mm in FIG. 6A; −(minus) 1.0 mm in FIG. 6B; 0.0 mm in FIG. 6C; +(plus) 1.0 mm in FIG. 6D; and +(plus) 2.0 mm in FIG. 6E. A plus sign means the focal position is on the near side of the irradiated surface of the workpiece W as seen from the light-focusing optical system 20, while a minus sign means the focal position is on the far side of the irradiated surface of the workpiece W as seen from the light-focusing optical system 20. FIG. 6C shows detection data D2 at a time when the laser beam L is focused at the irradiated surface of the workpiece W.

As illustrated, the focal position command data D1 (or teacher data D1) and the light detection data D2 (detection data 1 and 2) have a one-to-one linear correlativity. It will be understood by comparing the respective light detection data D2 of FIGS. 6A to 6E, even if the data of instantaneous value of light detected at a predetermined time are acquired simultaneously at two locations as the light detection data D2 (i.e., detection data 1 and 2), it is possible to interpret the one-to-one correlativity of data D1 and D2. Furthermore, as will be understood from FIGS. 6A to 6E, if the time-series data of light detected simultaneously at two locations over a predetermined time period are acquired as the light detection data D2 (i.e., detection data 1 and 2), the difference in waveform of the light detection data D2 of the respective focal position command data D1 (or teacher data D1) is apparent, and in addition thereto, the difference in waveform of the light detection data D2 simultaneously detected at two locations (i.e., detection data 1 and 2) from each other is also apparent. Therefore, the one-to-one correlativity of data D1 and D2 is more clearly interpreted than the light detection data D2 of FIGS. 5A to 5E, which are detected at a single location. As a result, it is possible to improve the precision of learning executed by the learning section 36, 44 and thereby generate a highly reliable learning model M. It is expected to further improve the precision of learning by increasing the number of parts of the same light to be simultaneously detected.

When performing the processing steps, in a case where the detection data D2 of physical quantity Q of light detected at a time when the workpiece W is irradiated with a laser beam L and simultaneously at two locations in a way similar to the learning steps is substantially the same as, e.g., the light detection data D2 shown in FIG. 6A, the positional relationship R between the workpiece W and the effective light-focusing position F at the time of light detection (i.e., at the time of performing the processing steps) is estimated as −2.0 mm (relative position). If it is assumed that the focal position command at this time is 0.0 mm (relative position), it is possible to correct the subsequent focal position command by +2.0 mm, and thereby to make the effective light-focusing position F during the processing steps accurately conform to the focal position command.

In the machine learning device 10 or 40, the data acquisition section 34 or 42 may be configured to acquire the light detection data D2 as data detected on the light of a predetermined wavelength. For example, the laser processing system 12 may have a configuration wherein the light detector 16 is arranged at a position enabling simultaneous detection of reflected light of the laser beam L with which the workpiece W is irradiated and resulting light (plasma, heat emission, etc.) generated by irradiating the workpiece W with the laser beam L, and an optical filter allowing the transmission of one of the reflected light and the resulting light (plasma, heat emission, etc.) is attached to the light detector 16. According to the configuration wherein the light detection data D2 used for learning is limited to only one of the reflected light and the resulting light (plasma, heat emission, etc.), it is possible to improve the learning efficiency and reliability of the learning model M.

Figure 7A:
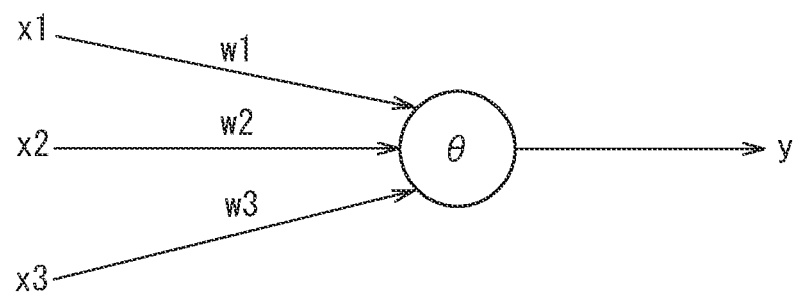
FIG. 7A is an illustration for explaining neurons.
Figure 7B:
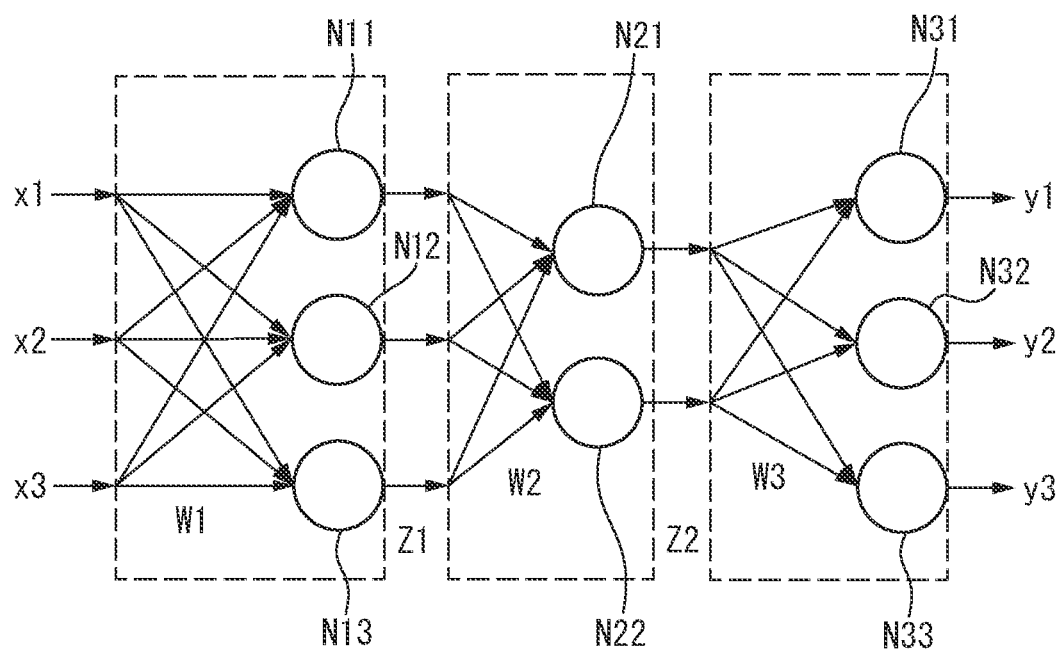
FIG. 7B is an illustration for explaining a neural network.

In the machine learning device 10 or 40, the learning section 36 or 44 may use a known learning algorithm, such as a decision tree, a neural network, etc., so as to proceed with the learning by supervised learning or another technique. FIG. 7A schematically shows a model of neuron. FIG. 7B schematically shows a model of a three-layer neural network configured by combining neurons each shown in FIG. 7A. The neural network may be configured by an arithmetic unit, a storage unit, etc., simulating a model of neurons.

The neuron shown in FIG. 7A outputs result "y" for a plurality of inputs "x" (in the drawing, inputs x1 to x3 as an example). Inputs "x" (x1, x2, x3) are multiplied respectively by weights "w" (w1, w2, w3). In the three-layer neural network shown in FIG. 7B, a plurality of inputs "x" (in the drawing, input x1 to input x3 as an example) are entered from a left side, and results "y" (in the drawing, result y1 to result y3 as an example) are output from a right side. In the illustrated example, inputs x1, x2, x3 are respectively multiplied by corresponding weights (collectively denoted by "W1"), and weighted inputs x1, x2, x3 are respectively entered into three neurons N11, N12, N13.

In FIG. 7B, the outputs of neurons N11 to N13 are collectively denoted by "Z1". Z1 can be deemed as a feature vector extracting the feature quantity of an input vector. In the illustrated example, feature vectors Z1 are multiplied respectively by corresponding weights (collectively denoted by "W2"), and each feature vector Z1 is entered into two neurons N21, N22. Feature vector Z1 represents a feature between weights W1 and W2. Further, in FIG. 7B, the outputs of neurons N21 to N22 are collectively denoted by "Z2". Z2 can be deemed as a feature vector extracting the feature quantity of feature vector Z1. In the illustrated example, feature vectors Z2 are multiplied respectively by corresponding weights (collectively denoted by "W3"), and each feature vector Z2 is entered into three neurons N31, N32, N33. Feature vector Z2 represents a feature between weights W2 and W3. Finally, neurons N31 to N33 respectively output results y1 to y3. In the machine learning device 10, 40, the learning section 36, 44 executes a multilayer calculation in accordance with the aforementioned neural network by using the learning dataset DS as input "x", so that it is possible to output the learning model M (i.e., result "y").

Figure 8:
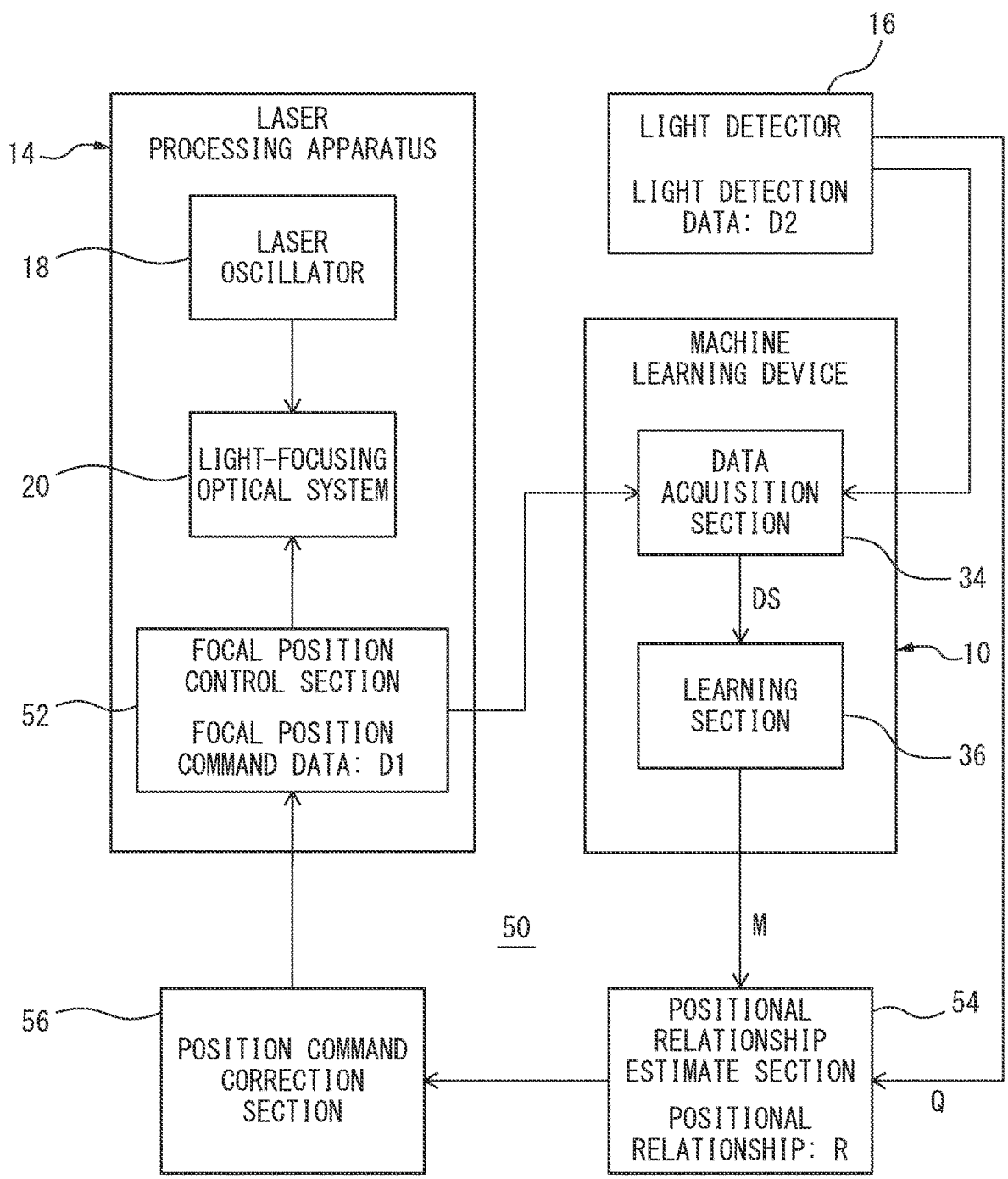
FIG. 8 is a functional block diagram showing a laser processing system according to one embodiment.

FIG. 8 shows a laser processing system 50 according to one embodiment by functional blocks. The laser processing system 50 has a configuration basically similar to that of the laser processing system 12 of FIG. 2. Corresponding components are denoted by common reference numerals or signs and explanations thereof are suitably omitted.

The laser processing system 50 includes a machine learning device 10, a laser processing apparatus 14 and a light detector 16. The laser processing apparatus 14 is provided with a laser oscillator 18, a light-focusing optical system 20 configured to focus a laser beam L emitted from the laser oscillator 18, and a focal position control section 52 configured to execute a movement control of a focal position of the light-focusing optical system 20 relative to the workpiece W. The focal position control section 52 corresponds, in functionality, to a component configured by integrating controller 22 and drive mechanism 24, provided in the aforementioned laser processing system 12. The light detector 16 is configured to detect a physical quantity Q of light sensed in a processing environment when a laser beam is emitted from the laser oscillator 18 in accordance with a processing command including a focal position command. When the machine learning device 10 executes learning, as already explained, the data acquisition section 34 acquires the data D1 of the focal position command from the focal position control section 52 and the detection data D2 of the physical quantity Q of light from the light detector 16, and the learning section 36 generates a learning model M by using the learning dataset DS including the data D1 and D2, the learning model M representing the correlativity between the physical quantity Q of light and the positional relationship R.

The laser processing system 50 further includes a positional relationship estimate section 54 configured to estimate a positional relationship R between a workpiece W and an effective light-focusing position F (FIG. 2) of the light-focusing optical system 20 during processing of the workpiece W, by using the learning model M generated by the learning section 36 and the physical quantity Q of light detected by the light detector 16; and a position command correction section 56 configured to correct the focal position command given to the laser processing apparatus 14, based on the positional relationship R estimated by the positional relationship estimate section 54.

The positional relationship estimate section 54 may be configured as, e.g., a processor of a computer (or one function of the processor), or alternatively, may be configured as, e.g., a program for allowing a processor of a computer to function (or one part of the program). Further, the positional relationship estimate section 54 may be installed in the machine learning device 10 or the controller 22 (FIG. 2). When the laser processing apparatus 14 performs processing steps on the workpiece W in accordance with a processing program, the light detector 16 detects the physical quantity Q of light in the same way as the learning steps, and the positional relationship estimate section 54 checks the physical quantity Q of light detected by the light detector 16 against the learning model M generated by the learning section 36, and thereby estimates the positional relationship R between the workpiece W and the effective light-focusing position F at the time of detection of light (i.e., at the time of performing the processing steps).

The position command correction section 56 may be configured as, e.g., a processor of a computer (or one function of the processor), or alternatively, may be configured as, e.g., a program for allowing a processor of a computer to function (or one part of the program). Further, the position command correction section 56 may be installed into the machine learning device 10 or the controller 22 (FIG. 2). When the laser processing apparatus 14 performs processing steps on the workpiece W in accordance with the processing program, the position command correction section 56 corrects a focal position command described in the processing program so as to compensate for the focal position offset which possibly arises in the light-focusing optical system 20 due to disturbances such as heat associated with laser beam irradiation, based on the positional relationship R estimated by the positional relationship estimate section 54.

According to the laser processing system 50, when performing the processing steps, the position command correction section 56 corrects the focal position command based on the positional relationship R estimated by the positional relationship estimate section 54, so that it is possible to improve the precision of correction of the focal position offset of the laser processing apparatus 14, in synergy with the aforementioned effects obtained by the machine learning device 10. If the focal position command can be precisely corrected, it is possible to prevent the quality of the laser processing performed by the laser processing apparatus 14 from being deteriorated. Further, the focal position offset is canceled and the laser processing is continuously performed with the effective light-focusing position F set as a target value, so that it is possible to reduce defacement or overheating of components of the light-focusing optical system 20 and improve the life-span of the components.

Further, according to the laser processing system 50, in the middle of the processing steps performed by the laser processing apparatus 14 on the workpiece W in accordance with the processing program, the physical quantity Q of light detected by the light detector 16 is checked against the learning model M generated by the learning section 36 so as to estimate in real time the positional relationship R between the workpiece W and the effective light-focusing position F at the time of performing the processing steps, and thereby it is possible to immediately correct the focal position command as needed. The laser processing system 50 can automatically perform the action such as detection, estimation and correction with no human work, so that it becomes possible to perform prolonged unmanned operation without causing processing defect. In this case, it is also possible for the machine learning device 10 to update the learning model M as needed, with the learning section 36 using the physical quantity Q of light detected during the processing steps as the light detection data D2.

In the laser processing system 50, as part of an initial setup just before performing the processing steps, it is also possible to perform the detection of the physical quantity Q of light, the estimation of the positional relationship R and the correction of the focal position command. When the focal position command can be corrected in the initial setup, it is possible to perform lean and high-quality processing of the workpiece W. In this case, separately from a workpiece W to be actually processed, it is possible to use a workpiece W exclusively provided for the initial setup (i.e., for the correction of the focal position command). When the workpiece W exclusively provided for correction is laser-processed under the same conditions as those in the learning steps, it is possible to improve the accuracy of checking of the detected physical quantity Q of light against the learning model M, and thereby to improve the precision of estimation of the positional relationship R executed by the positional relationship estimate section 54. Note that the laser processing system 50 may include a machine learning device 40 instead of the machine learning device 10.

Figure 9:
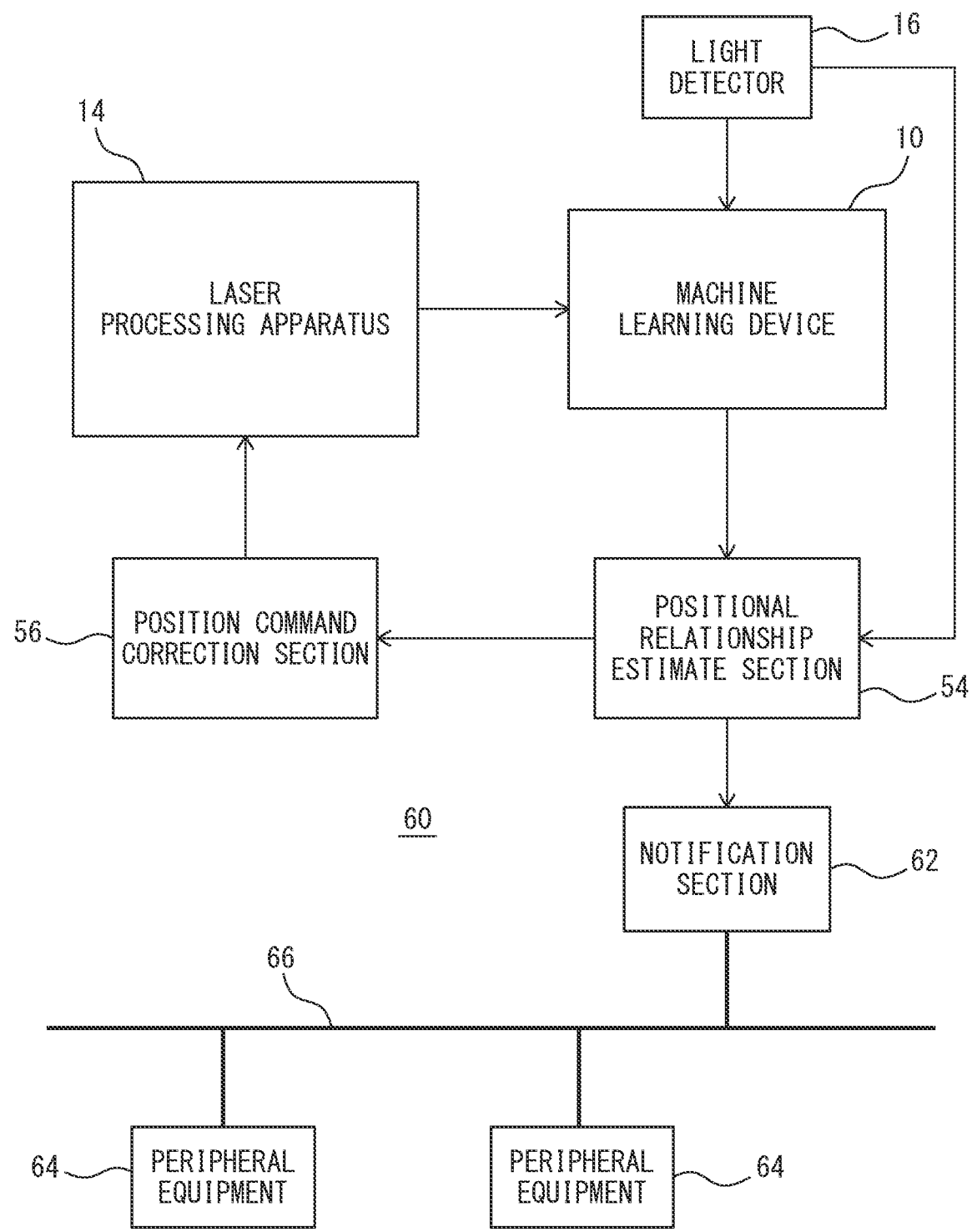
FIG. 9 is a functional block diagram showing a laser processing system according to another embodiment.

FIG. 9 shows a laser processing system 60 according to another embodiment by functional blocks. The laser processing system 60 has a specific function added to the laser processing system 50 of FIG. 8. Corresponding components are denoted by common reference numerals or signs and explanations thereof are suitably omitted.

The laser processing system 60 includes, in addition to the components of the laser processing system 50, a notification section 62 configured to perform a notification operation if the difference between the focal position command and the effective light-focusing position F (FIG. 2) at a time when the positional relationship estimate section 54 estimates the positional relationship R exceeds a predetermined threshold.

The notification section 62 may be configured as, e.g., a processor of a computer (or one function of the processor), or alternatively, may be configured as, e.g., a program for allowing a processor of a computer to function (or one part of the program). Further, the notification section 62 may be installed in the machine learning device 10 or the controller 22 (FIG. 2). When the laser processing apparatus 14 performs processing steps on the workpiece W in accordance with a processing program, if difference between the focal position command and the effective light-focusing position F, associated with the estimated positional relationship R, is excessive, the notification section 62 can make, e.g., the machine learning device 10 or the controller 22 generate noise, light, image display, etc., that can be sensed by human beings. The value of the threshold can be set in advance by a designer or operator of the laser processing system 60 with experience, etc. For example, when defacement or deterioration of components of the light-focusing optical system 20 progresses to such an extent that a specific work such as maintenance or replacement is necessary, it is possible, by setting a suitable threshold value, to induce the operator, etc., to prepare for or perform the specific work by the notification operation of the notification section 62, and as a result to reduce a system down-time.

The laser processing system 60 may further include a network 66 configured to establish communication between the notification section 62 and peripheral equipment 64 of the laser processing apparatus 14. Even when there is no operator, etc., of the laser processing system 60 near the laser processing apparatus 14, an operator, etc., can perceive at a remote location the notification operation of the notification section 62 through, e.g., the peripheral equipment 64 such as a monitor or personal computer connected to the network 66.

Figure 10:
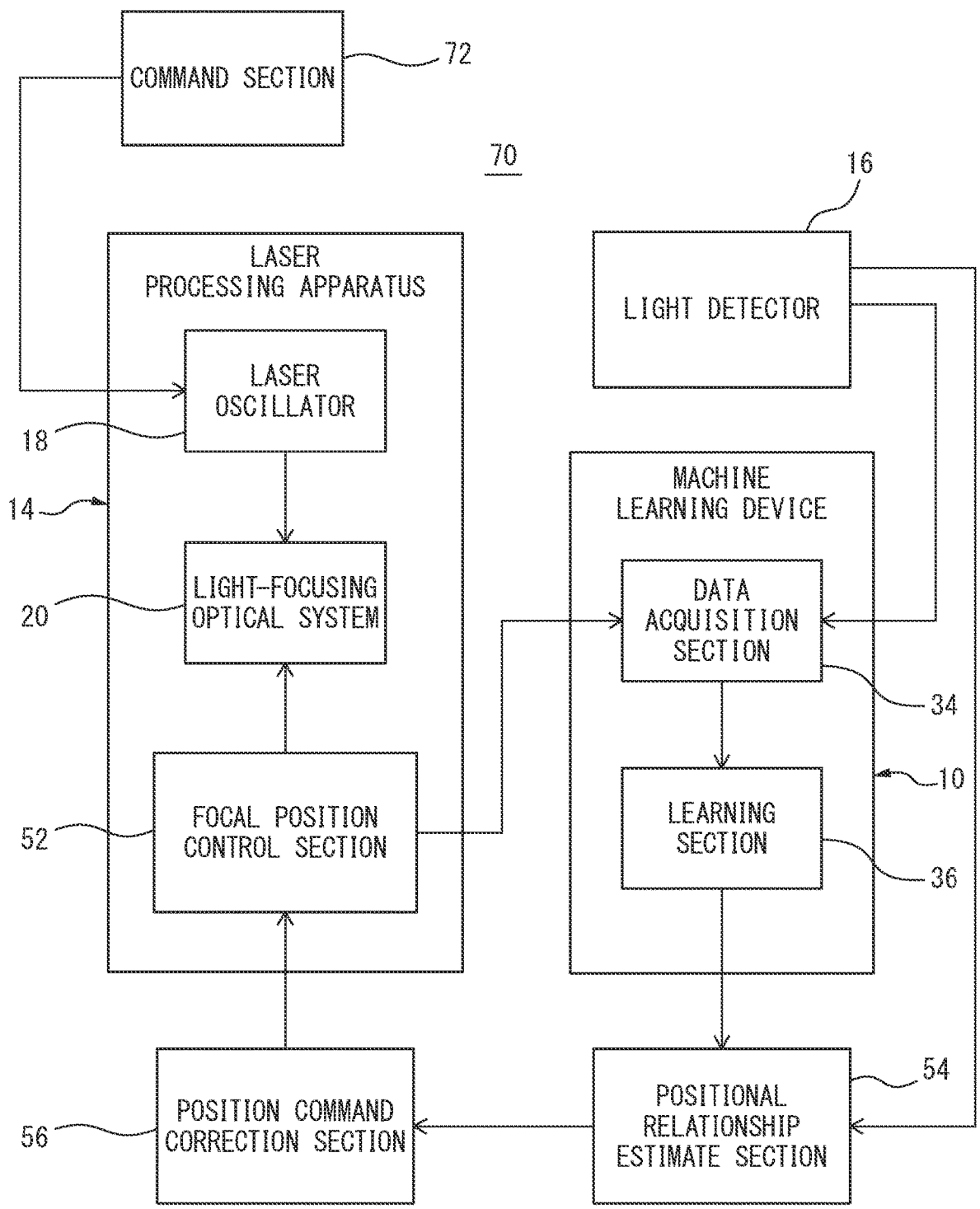
FIG. 10 is a functional block diagram showing a laser processing system according to still another embodiment.

FIG. 10 shows a laser processing system 70 according to still another embodiment by functional blocks. The laser processing system 70 has a specific function added to the laser processing system 50 of FIG. 8. Corresponding components are denoted by common reference numerals or signs and explanations thereof are suitably omitted.

The laser processing system 70 includes, in addition to the components of the laser processing system 50, a command section 72 configured to give the processing command to the laser oscillator 18, the processing command being a command value for learning or estimation purpose, which effects a lower energy than a command value for processing the workpiece W. The command value given by the command section 72 to the laser oscillator 18 is a value determining the energy of a laser beam emitted from the laser oscillator 18 and, e.g., a value relating to oscillation conditions (power, frequency, pulse width, etc.) which can be met by the laser oscillator 18.

The command section 72 may be configured as, e.g., a processor of a computer (or one function of the processor), or alternatively, may be configured as, e.g., a program for allowing a processor of a computer to function (or one part of the program). Further, the command section 72 may be installed into the machine learning device 10 or the controller 22 (FIG. 2). When the machine learning device 10 performs the aforementioned learning, the command section 72 makes the laser oscillator 18 emit a laser beam by a command value for learning purpose, which commands a laser beam emission with a lower energy than a command value generally used in the processing steps of a workpiece W. If the surface of the workpiece W is processed by a low-energy laser beam for learning while intentionally taking time, it becomes easy to recognize fluctuation in time-series data of light detected by the light detector 16 (e.g., shown in FIGS. 5A to 6E), which facilitates the interpretation of the correlativity between the physical quantity Q of light and the positional relationship R executed by the learning section 36. Alternatively, when the laser processing apparatus 14 performs processing steps on a workpiece W in accordance with a processing program, the command section 72 makes the laser oscillator 18 emit a laser beam by a command value for estimation purpose, which commands a laser beam emission with a lower energy than a command value generally used in the processing steps of the workpiece W. If the surface of the workpiece W is processed by a low-energy laser beam for estimation while intentionally taking time, it becomes easy to recognize fluctuation in time-series data of light detected by the light detector 16 (e.g., shown in FIGS. 5A to 6E), which improves the precision of estimation of the positional relationship R executed by the positional relationship estimate section 54 at a time when performing the processing steps. Further, it is possible to prevent the workpiece W to be subjected to the processing steps from being wastefully processed.

In the laser processing system 70, the command section 72 may be configured to give a command value for learning or estimation to the laser oscillator 18 while changing the command value as needed. The number of learning dataset DS is increased by changing the laser beam energy during learning, which facilitates the learning executed by the learning section 36. Further, the precision and accuracy of checking of the physical quantity Q of light detected at the time of performing the processing steps against the learning model M are improved by changing the laser beam energy during estimation, which improves the precision of estimation executed by the positional relationship estimate section 54.

In the laser processing system 70, the focal position control section 52 may be configured to move the focal position of the light-focusing optical system 20 as needed, during a period when the command section 72 gives the command value for learning or estimation to the laser oscillator 18. The number of learning datasets DS is increased by moving the focal position during learning, which facilitates the learning executed by the learning section 36. Further, the precision and accuracy of checking of the physical quantity Q of light detected at the time of performing the processing steps against the learning model M are improved by moving the focal position during estimation, which improves the precision of estimation executed by the positional relationship estimate section 54.

The laser processing system 60 or 70 provides effects basically equivalent to the aforementioned effects of the laser processing system 50. Further, the laser processing system 60 or 70 may include the machine learning device 40 instead of the machine learning device 10.

While the embodiments of the present disclosure have been described, it will be understood, by those skilled in the art, that various changes or modifications may be made thereto without departing from the scope of the following claims.

The invention claimed is:

1. A machine learning device configured to learn a positional relationship between a workpiece and an effective light-focusing position of a light-focusing optical system when a laser processing apparatus provided with the light-focusing optical system performs processing of the workpiece, the machine learning device comprising:
   a data acquisition section configured to acquire a learning dataset over a period of time, the learning dataset including:
      data of a focal position command for the light-focusing optical system output over the period of time from a machine controller to the laser processing apparatus, and
      detection data of a physical quantity of light detected over the period of time by a light detector when a laser beam is emitted from a laser oscillator of the laser processing apparatus on the workpiece in accordance with the focal position command; and
   a learning section configured to:
      generate a learning model by instructing the data acquisition section to vary the focal position command over different time periods to produce the learning dataset, the learning model including a plurality of light intensity signatures at a plurality of different focal positions representing correlativity between said physical quantity of light and said positional relationship between the workpiece and the varying focal position command, and
      after the learning model is generated:
         determine a corrected focal position command based on a comparison between new detection data of the physical quantity of light over a new period of time and the detection data of the learning model, the comparison including comparing the new detection data to the learning model to determine one of the plurality of light intensity signatures that correlates to the new detection data, the corrected focal position command being based on one of the plurality of different focal positions that corresponds to the correlated one of the plurality of light intensity signatures, and
         instructing the machine controller to output the corrected focal position command.

2. The machine learning device of claim 1, wherein the physical quantity comprises light intensity of reflected light of the laser beam with which the workpiece is irradiated, or light intensity of resulting light generated by irradiating the workpiece with the laser beam.

3. The machine learning device of claim 1, wherein the learning section is configured to use the data of the focal position command as teacher data, and determine correlativity between the detection data and the teacher data so as to generate the learning model.

4. The machine learning device of claim 1, wherein the data acquisition section is configured to acquire the detection data as time-series data of the light detected for a predetermined time period.

5. The machine learning device of claim 4, wherein the learning section is configured to use the detection data in a form of data obtained by processing the time-series data by any one of normalization, smoothing, Fourier transformation, function approximation and differentiation.

6. The machine learning device of claim 1, wherein the data acquisition section is configured to acquire the detection data as a plurality of data detected at a plurality of different parts of the light.

7. The machine learning device of claim 1, wherein the data acquisition section is configured to acquire the detection data as data detected on the light of a predetermined wavelength.

8. A laser processing system comprising:
   a laser processing apparatus provided with a laser oscillator, a light-focusing optical system configured to focus a laser beam emitted from the laser oscillator, and a focal position control section configured to execute a movement control of a focal position of the light-focusing optical system;
   the machine learning device as set forth in claim 1;
   a light detector configured to detect a physical quantity of light sensed when the laser beam is emitted from the laser oscillator in accordance with a processing command including a focal position command;
   a positional relationship estimate section configured to estimate a positional relationship between a workpiece and an effective light-focusing position of the light-focusing optical system during processing of the workpiece, by using the learning model generated by the learning section and the physical quantity detected by the light detector; and
   a position command correction section configured to correct the focal position command given to the laser processing apparatus, based on the positional relationship estimated by the positional relationship estimate section.

9. The laser processing system of claim 8, further comprising a notification section configured to perform a notification operation if a difference between the focal position command and the effective light-focusing position when the positional relationship is estimated by the positional relationship estimate section exceeds a predetermined threshold.

10. The laser processing system of claim 9, further comprising a network configured to establish communication between the notification section and peripheral equipment of the laser processing apparatus.

11. The laser processing system of claim 8, further comprising a command section configured to give the processing command to the laser oscillator, the processing command comprising a command value for learning or estimation so as to effect a lower energy than a command value for processing the workpiece.

12. The laser processing system of claim 11, wherein the focal position control section is configured to move the focal position of the light-focusing optical system during a period when the command section gives the command value for learning or estimation to the laser oscillator.

13. A machine learning method configured to learn a positional relationship between a workpiece and an effective light-focusing position of a light-focusing optical system when a laser processing apparatus provided with the light-focusing optical system performs processing of the workpiece, the machine learning method comprising the steps, executed by a processor, of:

acquiring a learning dataset over a period of time, the learning dataset including:

data of a focal position command for the light-focusing optical system output over the period of time from a machine controller to the laser processing apparatus and detection data of a physical quantity of light detected over the period of time by a light detector when a laser beam is emitted from a laser oscillator of the laser processing apparatus on the workpiece in accordance with the focal position command; and generating a learning model by instructing the data acquisition section to vary the focal position command over different time periods to produce the learning dataset, the learning model including a plurality of light intensity signatures at a plurality of different focal positions representing correlativity between said physical quantity of light and said positional relationship between the workpiece and the varying focal position command, and after the learning model is generated:

determine a corrected focal position command based on a comparison between new detection data of the physical quantity of light over a new period of time and the detection data of the learning model, the comparison including comparing the new detection data to the learning model to determine one of the plurality of light intensity signatures that correlates to the new detection data, the corrected focal position command being based on one of the plurality of different focal positions that corresponds to the correlated one of the plurality of light intensity signatures, and instructing the machine controller to output the corrected focal position command.

14. The machine learning method of claim 13, further comprising previously processing a surface of the workpiece by the laser processing apparatus before acquiring the learning dataset, and wherein generating the learning model includes using the detection data acquired when the surface processed previously is irradiated with the laser beam.

15. The machine learning method of claim 13, wherein generating the learning model includes using a plurality of types of workpieces different in shapes, surface conditions, materials or temperatures.

* * * * *